US012456842B2

(12) United States Patent
Little et al.

(10) Patent No.: US 12,456,842 B2
(45) Date of Patent: Oct. 28, 2025

(54) ELECTRICAL CONNECTOR HAVING MOLDED TERMINAL UNIT AND MOLDED CONDUCTIVE PLASTIC MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Patrick R. Casher, North Aurora, IL (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 607 days.

(21) Appl. No.: 17/739,087

(22) Filed: May 7, 2022

(65) Prior Publication Data

US 2022/0368076 A1 Nov. 17, 2022

Related U.S. Application Data

(60) Provisional application No. 63/267,812, filed on Feb. 10, 2022, provisional application No. 63/201,807, filed on May 13, 2021.

(51) Int. Cl.

| | |
|---|---|
| ***H01R 13/6471*** | (2011.01) |
| ***H01R 4/02*** | (2006.01) |
| ***H01R 13/405*** | (2006.01) |
| ***H01R 13/516*** | (2006.01) |
| ***H01R 13/627*** | (2006.01) |
| ***H01R 13/639*** | (2006.01) |

(52) U.S. Cl.

CPC ......... *H01R 13/6471* (2013.01); *H01R 4/023* (2013.01); *H01R 13/405* (2013.01); *H01R 13/516* (2013.01); *H01R 13/6272* (2013.01); *H01R 13/639* (2013.01)

(58) Field of Classification Search

CPC .. H01R 13/6471; H01R 4/023; H01R 13/405; H01R 13/516; H01R 12/79

USPC .......................................................... 439/108

See application file for complete search history.

(56) References Cited

U.S. PATENT DOCUMENTS

| | | | |
|---|---|---|---|
| 9,004,942 | B2 | 4/2015 | Paniagua et al. |
| 9,124,009 | B2 | 9/2015 | Atkinson |
| 9,660,384 | B2 | 5/2017 | Paniagua et al. |
| 10,381,767 | B1 | 8/2019 | Milbrand, Jr. et al. |
| 10,777,921 | B2 | 9/2020 | Lu et al. |

(Continued)

FOREIGN PATENT DOCUMENTS

| | | |
|---|---|---|
| CN | 109193206 A | 1/2019 |
| CN | 109462071 A | 3/2019 |

*Primary Examiner* — Tulsidas C Patel

*Assistant Examiner* — Jeffrey Mountain

(74) *Attorney, Agent, or Firm* — Ming Chieh Chang

(57) ABSTRACT

An electrical connector includes: a unitary insulative housing having a tongue and a cavity; two rows of terminals molded in the insulative housing while exposing to two opposite surfaces of the tongue, respectively, each row of terminals including plural signal terminals and plural ground terminals, the ground terminals being exposed to the cavity; and a conductive plastic member molded in the cavity to be in contact with the ground terminals.

7 Claims, 14 Drawing Sheets

(56) References Cited

U.S. PATENT DOCUMENTS

| | | | | |
|---|---|---|---|---|
| 2013/0316566 | A1* | 11/2013 | Little | H01R 12/7005 439/378 |
| 2019/0131731 | A1* | 5/2019 | Lee | H01R 12/716 |
| 2020/0076132 | A1* | 3/2020 | Yang | H01R 12/73 |
| 2020/0083627 | A1 | 3/2020 | Peloza et al. | |
| 2020/0203886 | A1* | 6/2020 | Wu | H01R 13/6272 |
| 2020/0266584 | A1 | 8/2020 | Lu | |
| 2020/0366017 | A1 | 11/2020 | Blackburn et al. | |
| 2021/0050683 | A1 | 2/2021 | Sasame et al. | |
| 2021/0351536 | A1 | 11/2021 | Chung et al. | |
| 2022/0029360 | A1 | 1/2022 | Little et al. | |
| 2022/0094099 | A1 | 3/2022 | Liu et al. | |

* cited by examiner

ELECTRICAL CONNECTOR HAVING MOLDED TERMINAL UNIT AND MOLDED CONDUCTIVE PLASTIC MEMBER

CROSS REFERENCE TO RELATED APPLICATIONS

This application claims priority to and the benefit of U.S. Provisional Patent Applications No. 63/201,807, filed on May 13, 2021, and No. 63/267,812, filed on Feb. 10, 2022, the contents of which are incorporated entirely herein by reference.

BACKGROUND OF THE INVENTION

1. Field of the Invention

The present invention relates to an electrical connector of a tongue in receptacle design including an insert molded terminal unit and an insert molded conductive plastic member to be in contact with plural ground terminals of the terminal unit.

2. Description of Related Arts

U.S. Patent Application Publication No. 2021/0050683 discloses an electrical connector including a housing having opposite first and second sidewalls and a cavity therebetween, first and second sets of terminals disposed in the cavity adjacent to the first and second sidewalls, first and second insulative members supporting the first and second sets of terminals, and a resonant damping component disposed in the cavity between the first and second sets of terminals, wherein the resonant damping component has ridges and the insulative member has notches so that the former is electrically coupled to ground terminals of the first and second sets of terminals.

U.S. Pat. No. 10,777,921 discloses a card edge connector including a conductive plastic member. U.S. Patent Application Publication No. 2020/0083627 discloses a connector assembly including a free-end connector and a mating fixed-end connector, wherein the fixed-end connector has a plug housing, plug wafers joined together within the plug housing, and ground lead frames that provide ground communing. U.S. Patent Application Publication No. 2020/0266584 discloses an electrical connector including an insulative housing, a first and second terminal subassemblies disposed in the housing, and a lossy member disposed in the housing, wherein the lossy member is comprised of a body portion and a plurality of projections extending from the body portion, and wherein the projections of the lossy member are comprised of a plurality of contact portions that extend towards intermediate portions of first and second terminals.

An improved arrangement is desired to have the cable directly electrically connect to the other component via a signal connector rather than cooperation of plural connectors.

SUMMARY OF THE INVENTION

An object of the present invention is to provide an electrical connector with high electric performance.

In order to achieve above-mentioned object, an electrical connector comprises: a unitary insulative housing having a tongue and a cavity; two rows of terminals molded in the insulative housing while exposing to two opposite surfaces of the tongue, respectively, each row of terminals including a plurality of signal terminals and a plurality of ground terminals, the plurality of ground terminals being exposed to the cavity; and a member made from conductive plastic and/or liquid metal ink or conductive ink molded in the cavity to be in contact with the plurality of ground terminals. A method of making an electrical connector comprises the steps of: molding two rows of terminals with an insulative housing while exposing the two rows of terminals to a tongue of the insulative housing and at least some of the two rows of terminals to a cavity of the insulative housing; and molding a conductive plastic member in the cavity to be in contact with the at least some of the two rows of terminals.

Other objects, advantages and novel features of the disclosure will become more apparent from the following detailed description when taken in conjunction with the accompanying drawings.

DETAILED DESCRIPTION OF THE PREFERRED EMBODIMENT

Referring to FIGS. 1-14, an electrical connector assembly comprises a cable plug connector 50 connecting with a plurality of cables 90 and a mating receptacle connector 10 mounted on a printed circuit board 200. The receptacle connector 10 features a tongue in receptacle design where non-cantilever beam tongue is adopted in order to reduce overall mating height. The plug connector 50 features cantilever beam design in order to reduce overall mating height and provide adequate wiping distance.

Figure 2:
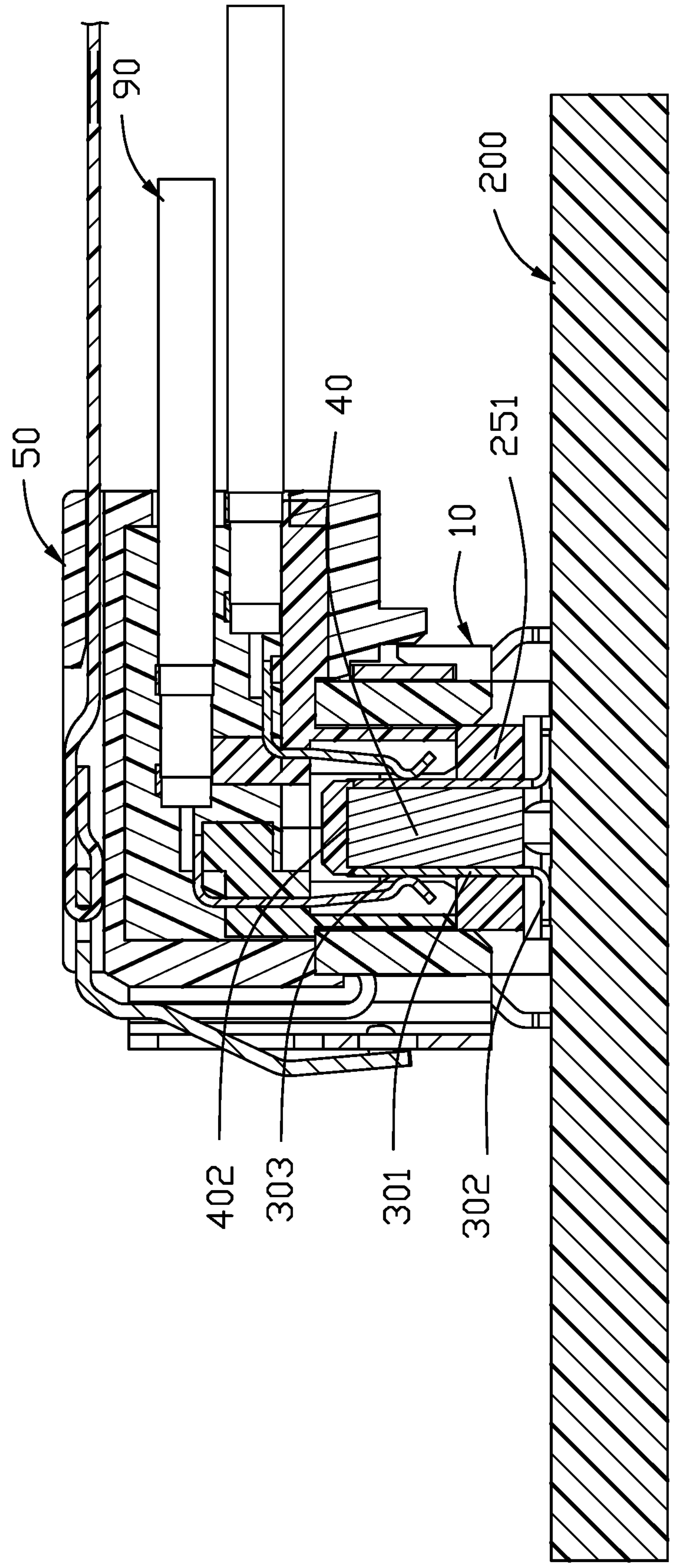
FIG. 2 is a cross-sectional view of the electrical connector assembly.
Figure 3:
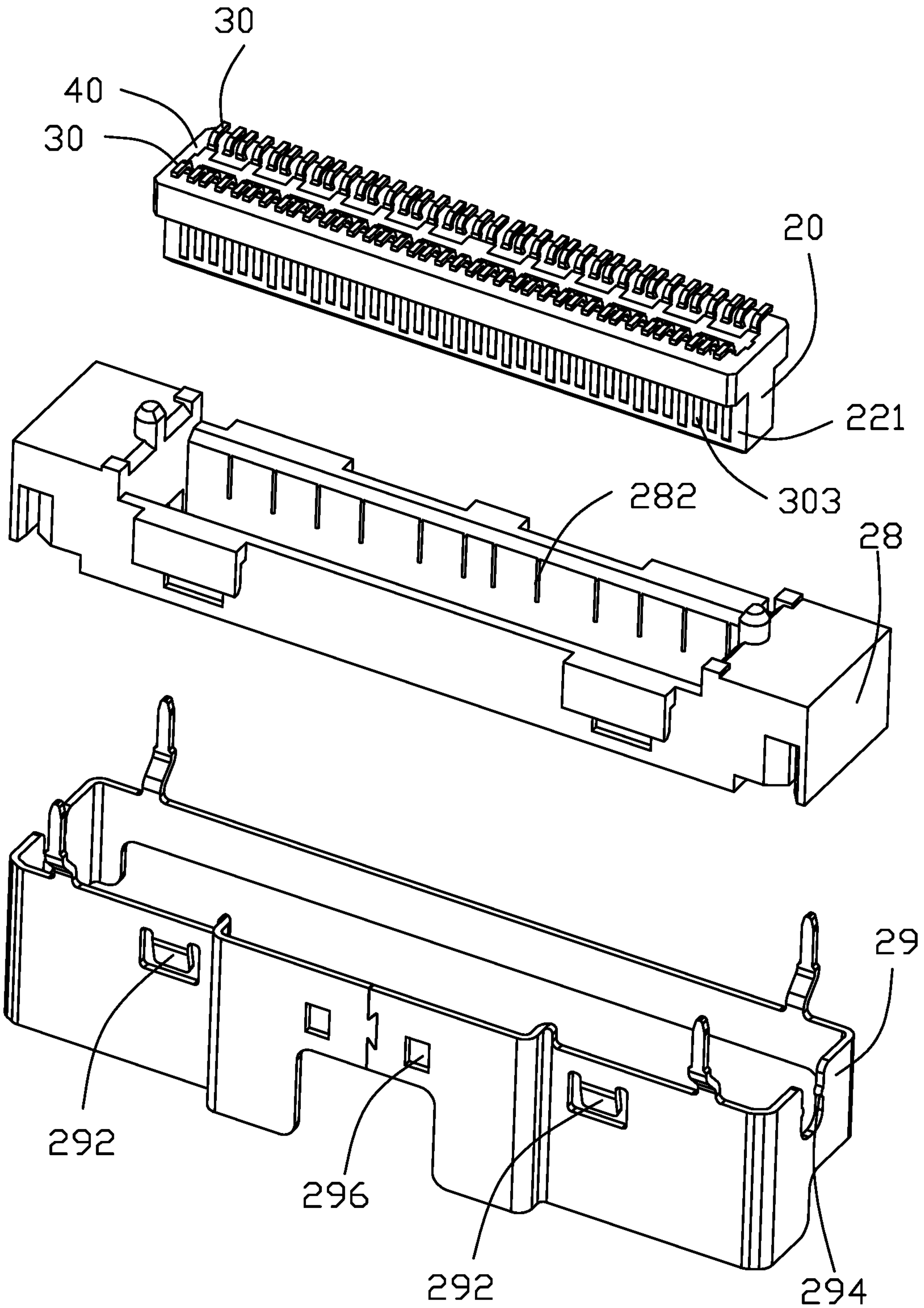
FIG. 3 is a perspective view of a receptacle connector of the electrical connector assembly.
Figure 4:
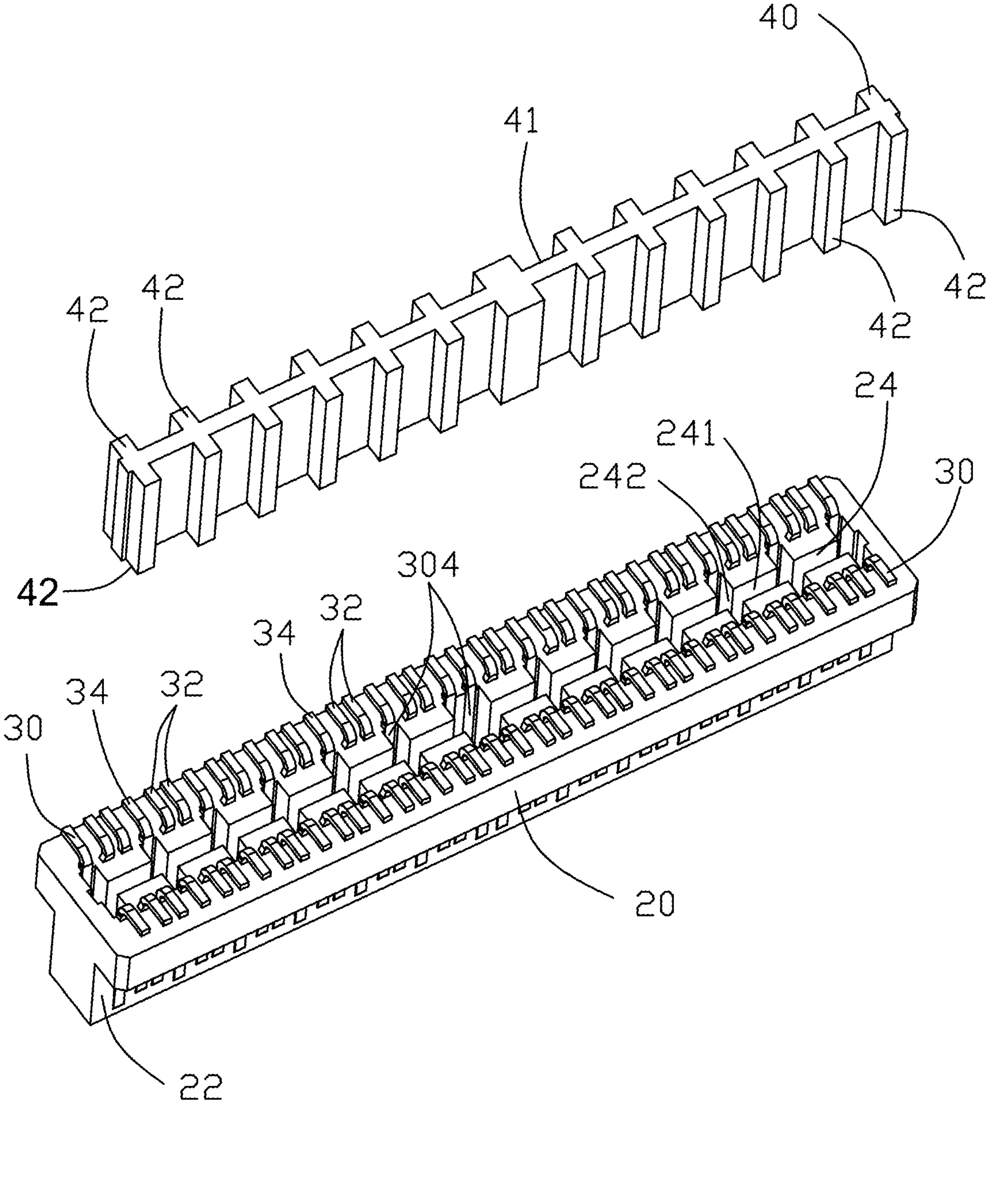
FIG. 4 is an exploded view of the receptacle connector.
Figure 5:
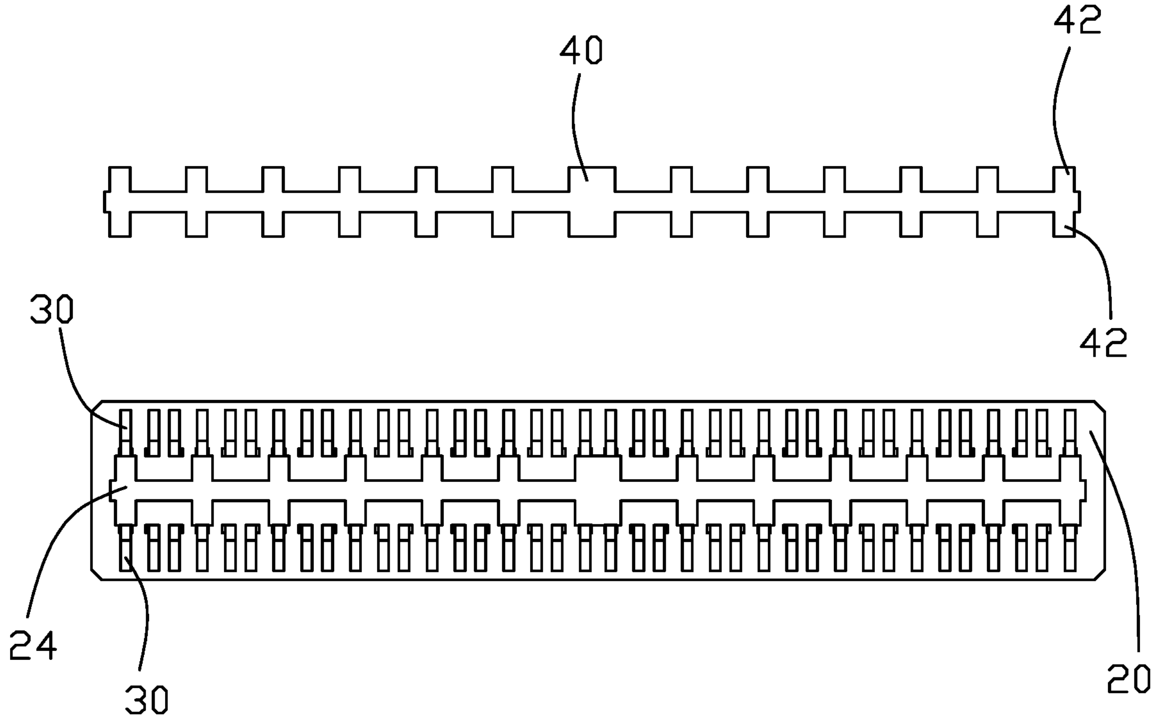
FIG. 5 is a bottom plan view of FIG. 4.

Referring to FIGS. 3-5 in particular, the receptacle connector 10 includes a unitary insulative housing 20 having a tongue 22 and a cavity 24, two rows of terminals 30 molded in the insulative housing 20 while exposing respectively to two opposite surfaces 221 of the tongue 22, and a conductive plastic member 40. Each row of terminals 30 includes a plurality of signal terminals 32 and a plurality of ground terminals 34 and the plurality of ground terminals 34 are exposed to the cavity 24. The conductive plastic member 40 is molded in the cavity 24 to be electrically coupled to the plurality of ground terminals 34. In a varied design, the conductive plastic member 40 may be replaced by or combined with liquid metal ink or conductive ink that flows and then is cured in the cavity 24. Combination with FIG. 2, each terminal 30 includes a board-shaped upright portion 301 and a soldering portion 302 extending from the bottom 201 of the insulative housing 20, part of the upright portion expose upon the surface 221 of the tongue 22 are constructed as contacting faces 303. The two rows of terminals are embedded in the insulative housing 20, as best shown in FIG. 4, the upright portions 301 of the signal terminals 32 are embedded in the insulating housing, without any portions exposing to the cavity. Inner faces 304 of the upright portions of the grounding terminals 34 expose upon the cavity 24. The conductive plastic 40 is formed by inserted molding process into the cavity 24. As best shown in FIG. 4, the cavity 24 includes a longitudinal slot 241 and transverse slots 242 at opposite sides of the longitudinal slot 241. The conductive plastic 40 is shaped according to the cavity 24, which includes a longitudinal portions 41 and two columns of transverse portions 42. The longitudinal portion 41 is of an upright board shape, the transverse portions 42 are in a shape of upright rib. The upright ribs 42 contact the upright portions 301 of the grounding terminals 34.

Figure 1:
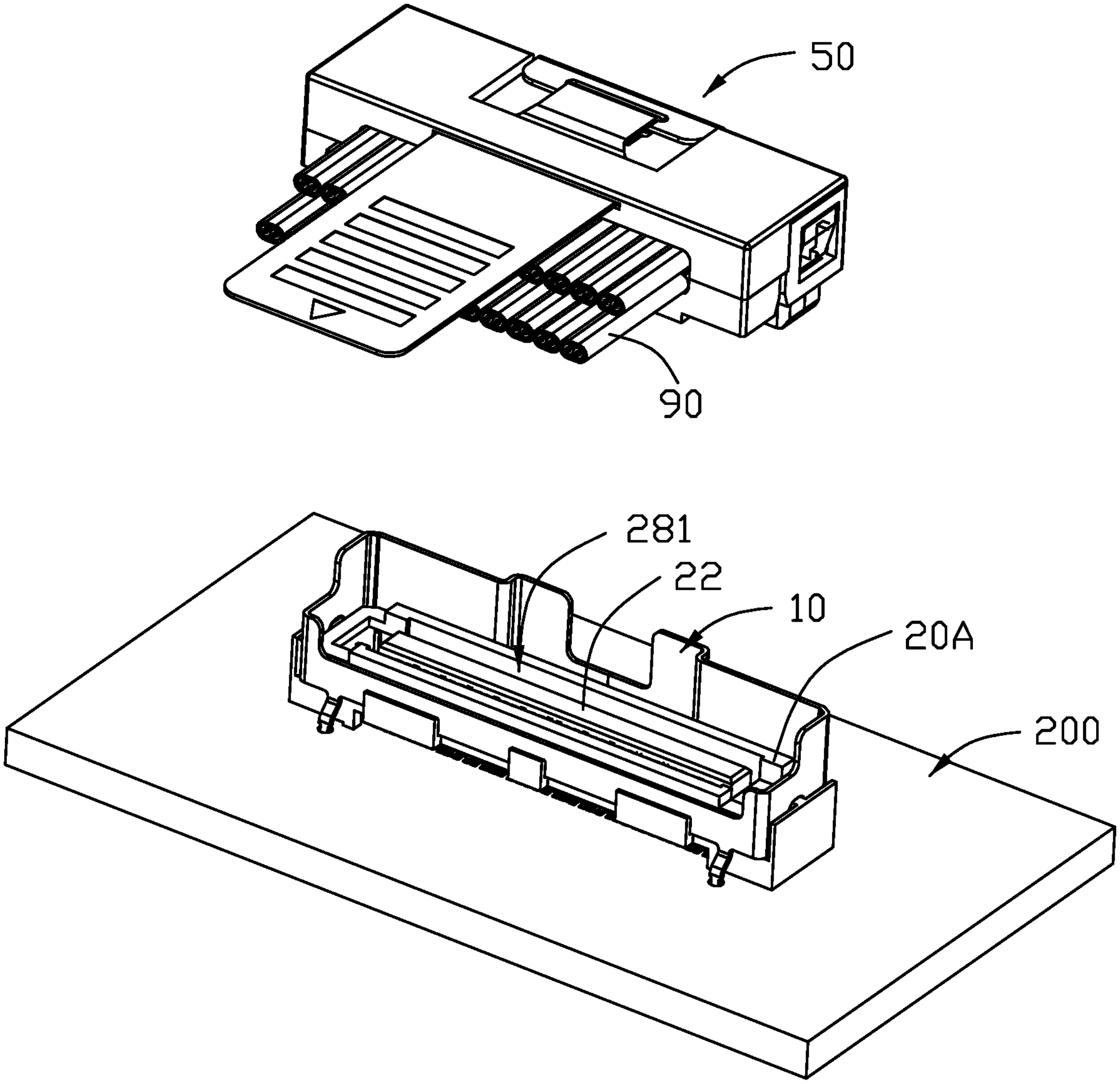
FIG. 1 is a perspective view of an electrical connector assembly in accordance with the present invention mounted on a printed circuit board.

The receptacle connector 10 may further include a shroud 28 enclosing the insulative housing 20 and a receptacle shell 29 enclosing the shroud 28. The tongue 22 are inserted in the shroud 28 and surrounded with the shroud, thereby forming a mating cavity 281 among the tongue 22 and the shroud 28. The shroud 28 may have features such as ribs 282 for retaining the insulative housing 20. The shell 29 may have retention features such as tabs 292 and barbs 294 for retaining to the shroud 28. The signal terminals 32 are preferably arranged in pairs for differential signals transmission. As shown in FIG. 1, the insulative housing 20 and the shroud 28 commonly form an insulative seat 20A and the shell 29 extends upward beyond an upper face or mating face 202 of the seat 20A. The shell further defines a locking portion or hole 291.

The conductive plastic member 40 has two rows of branches which is in shape of upright rib 42 aligned with corresponding ground terminals 34 so that when the former is molded in place all ground terminals 34 are in contact therewith. Each ground terminal 34 has a contacting portion, and the conductive plastic member 40 has an upper surface substantially leveled with an upper end of the contacting portion, as is clearly seen in FIG. 2, for improved signal integrity. The conductive plastic member 40 shields the whole upright portions 301 of the grounding terminals 34.

The method of making the receptacle connector 10 comprises the steps of: molding two rows of terminals with the insulative housing 20 while exposing the two rows of terminals to the tongue 22 of the insulative housing and at least some of the two rows of terminals to a cavity of the insulative housing; and molding a conductive plastic member in the cavity to be in contact with the at least some of the two rows of terminals. The insulative housing 20 molded with the terminals 30 and the conductive plastic 40 is inserted into the shroud 28 from a bottom of the shroud and a mating space 281 is defined between the insulative housing and the shroud.

Referring to FIGS. 6-13 in particular, the plug connector 50 includes a plug contact assembly 60 with a cable 90 terminated thereto, an upper cover 70 and a lower cover 75, a pull strap 80 and a latch 85, and a hot melt glue 95. The cables 90 are arranged in an upper and lower rows. The contact assembly 60 includes a front contact unit 62, a rear contact unit 64, an upper ground bar 66 retaining the upper row of the cable 90 to the front contact unit 62, and a lower ground bar 68 retaining the lower row of the cable 90 to the rear contact unit 64. Each of the front contact unit 62 and the rear contact unit 64 is structured as an insert molded lead frame assembly, namely, each unit having respective contacts corresponding to an associated row of terminals 30. The front contact unit 62 and the rear contact unit 64 are combined together by way of locating posts 622 and holes 642. Both the upper and lower ground bars 66 and 68 may be suitably secured to securing features 644 and 646 of the rear contact unit 64. Each ground bar 66 or 68 has plural fingers 662 or 682 for connecting to corresponding ground terminals 34. The cable 90 may be twin-ax raw cable wires 91 directly attached to pairs of the signal terminals 32 in a well known manner with respective shielding layers 92 thereof being in contact with associated ground bar. After attaching the ground bars and terminating the cable, the hot melt glue 95 may suitably be injection molded in place. Thereafter, the upper cover 70 and the lower cover 75 may be assembled and also the pull strap 80 and the latch 85 may be mounted.

Figure 14:
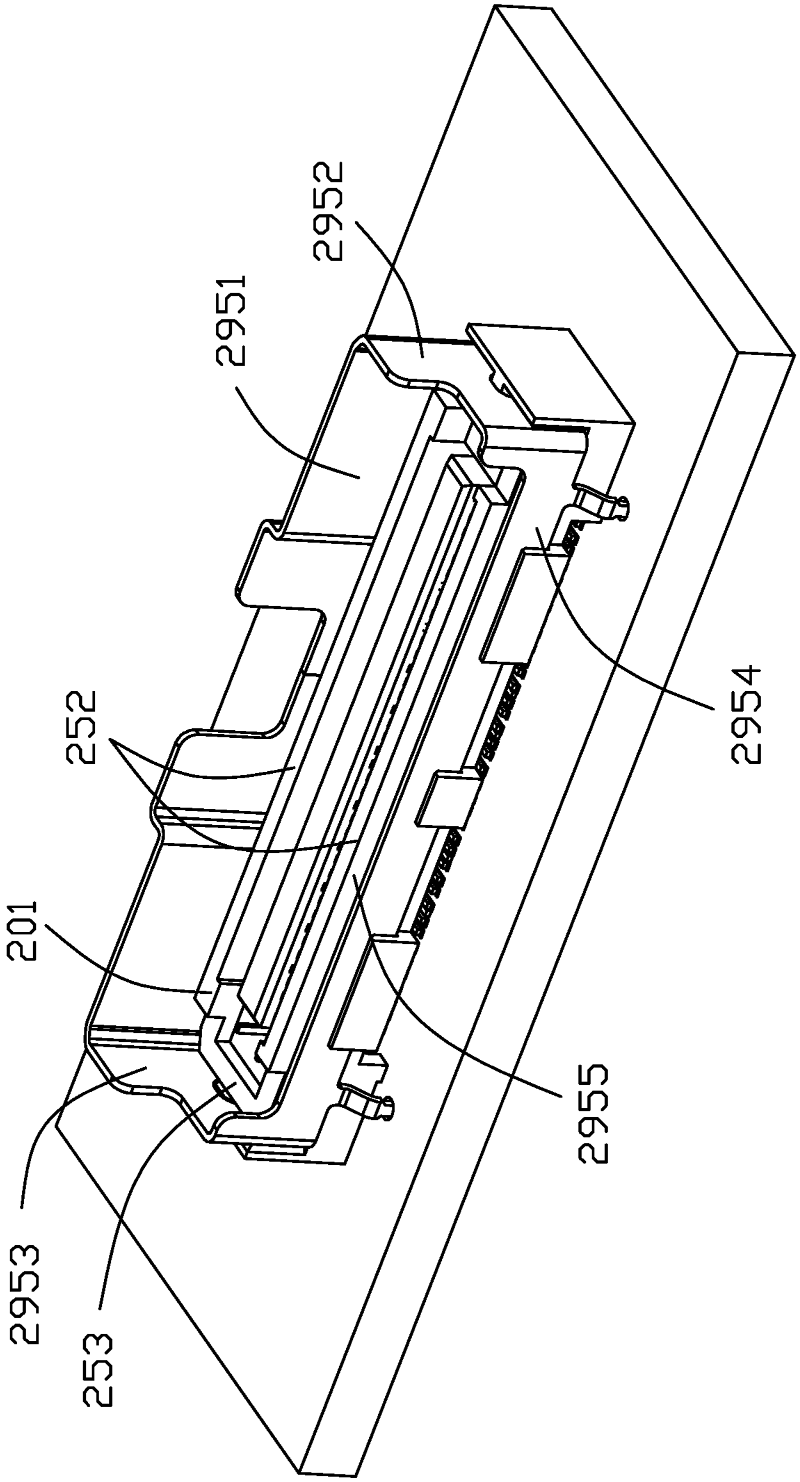
FIG. 14 is a perspective view of the receptacle connector on the PCB.

As shown in FIGS. 2 and 14, the receptacle connector 10 for mounting on the printed circuit board 200 includes the seat 20A which includes a bottom wall 251 confronting with the printed circuit board, four upright walls 252 and 253, the upright tongue 22, and the mating space 281 defined among the upright walls 252 and 253 and the tongue 22, the receiving space 281 opening upward from the bottom wall 251 thereof, the four upright walls comprising two opposite longitudinal walls 252 and two transverse walls 253. The two rows of terminals 30 comprise the upright portions 301 and the soldering portions 302 extending from the bottom wall 251; the upright portions 301 define contacting faces 303 exposing upon two opposite surfaces 221 of the tongue 22. The metallic shell 29 comprises four upright plates 2951-2954 fittingly enclosing the seat. The three upright plates 2951-2953 of the four upright plates attached to one longitudinal wall 252 and two transverse walls 253 extend upwards beyond a top face 202 of the seat; the upright plate 2954 attached to said one longitudinal wall defines a locking hole 296 for latch with a plug connector mating with the receptacle connector. The upright plate 2954 attached to the other longitudinal wall extends upward beyond the top face 202 of the seat and further defines a longitudinal notch 2955; a top edge of the longitudinal notch is substantially leveled with the top face 202 of the seat.

Figure 6:
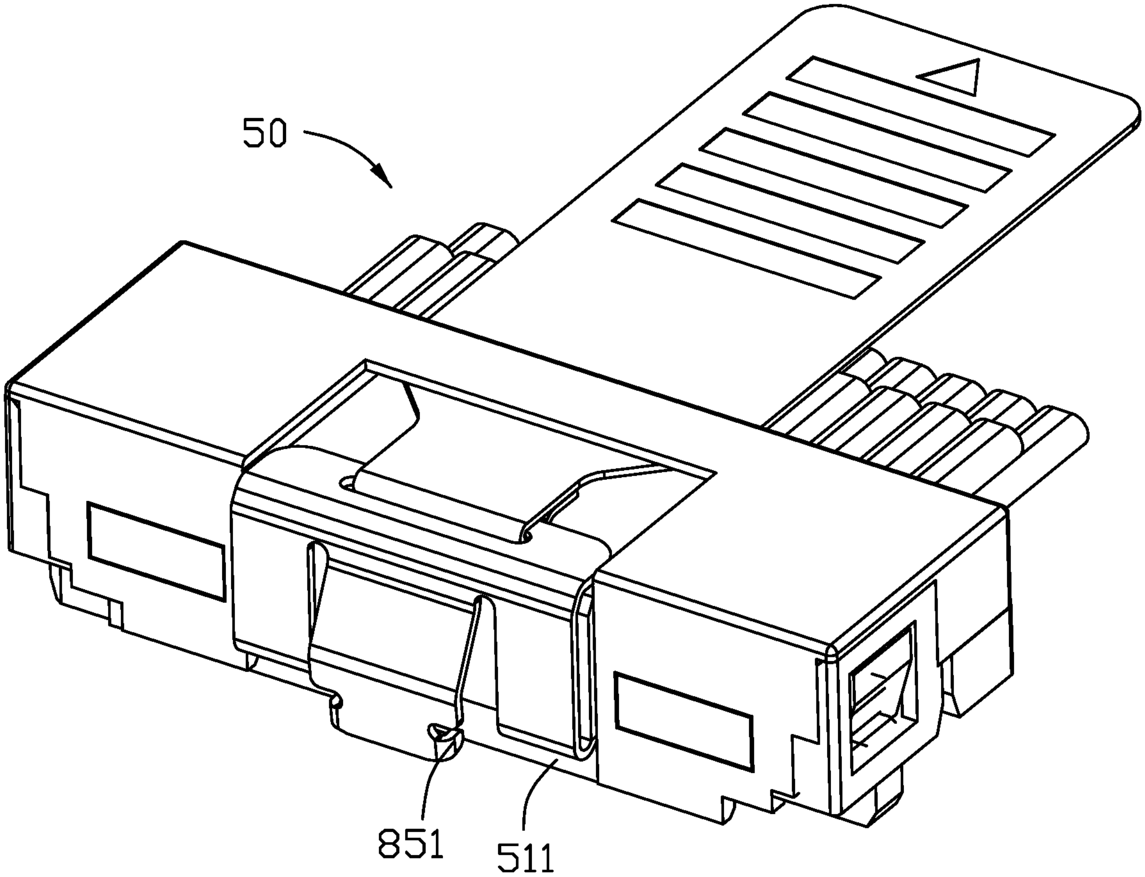
FIG. 6 is a perspective view of a plug connector of the electrical connector assembly.
Figure 7:
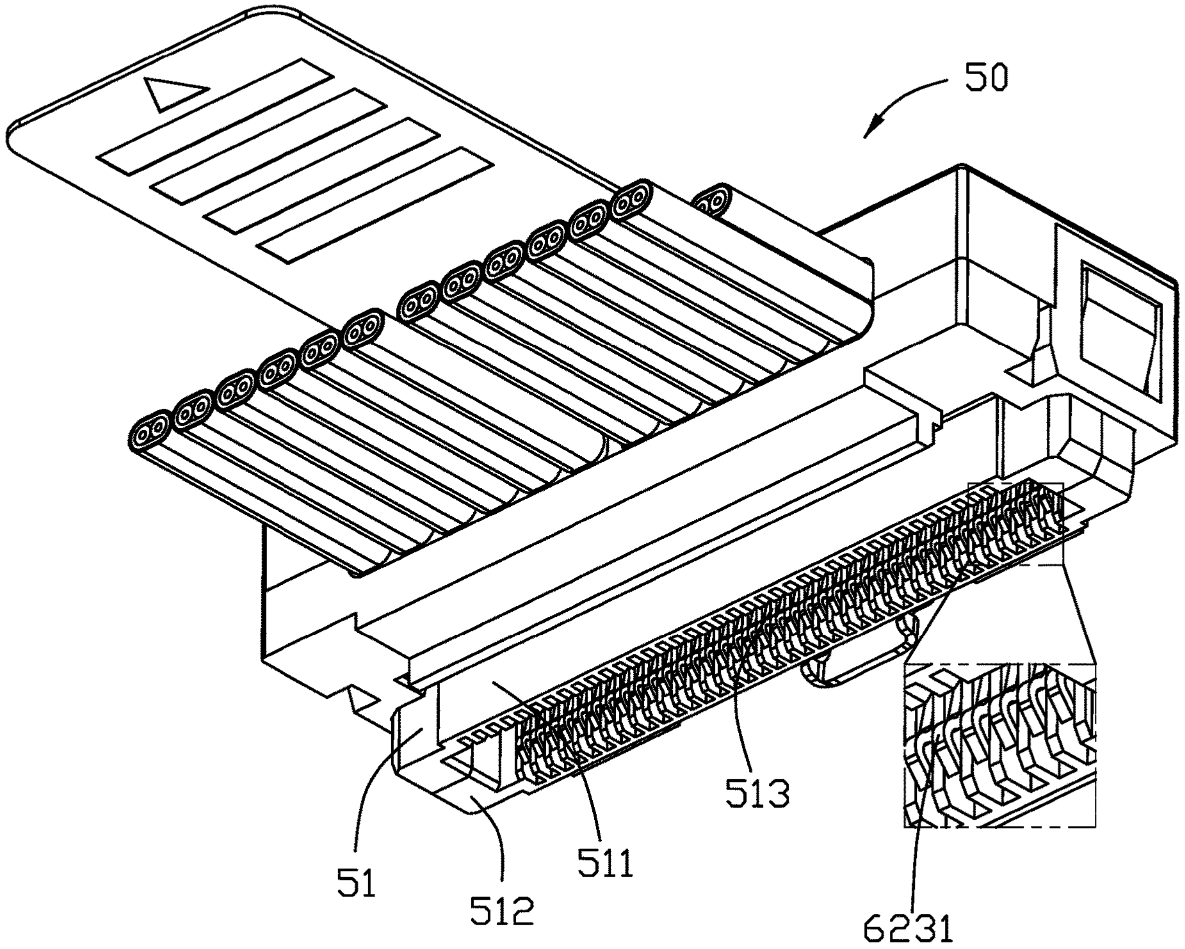
FIG. 7 is another perspective view of the plug connector.
Figure 8:
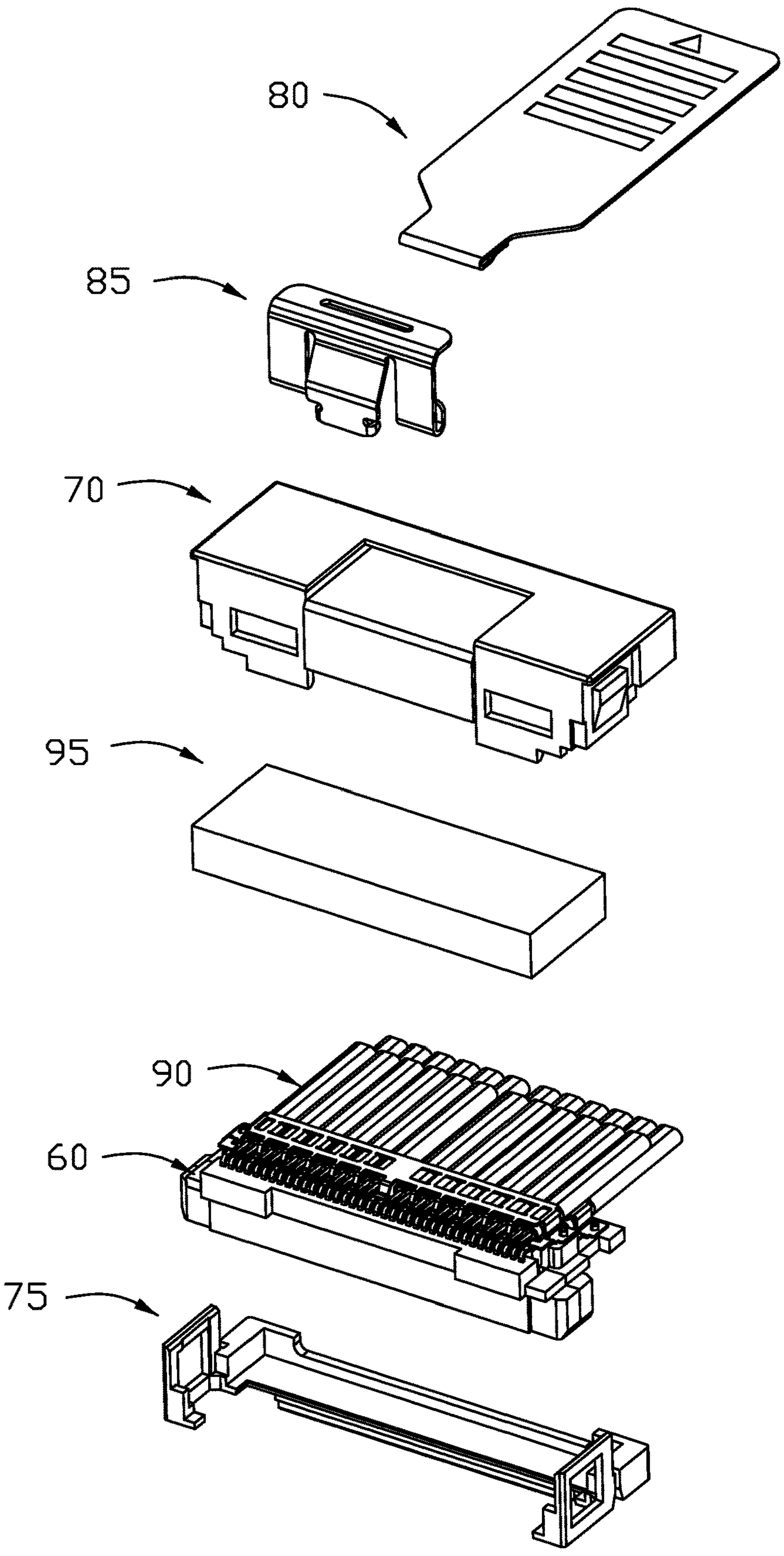
FIG. 8 is an exploded view of the plug connector in FIG. 6.
Figure 9:
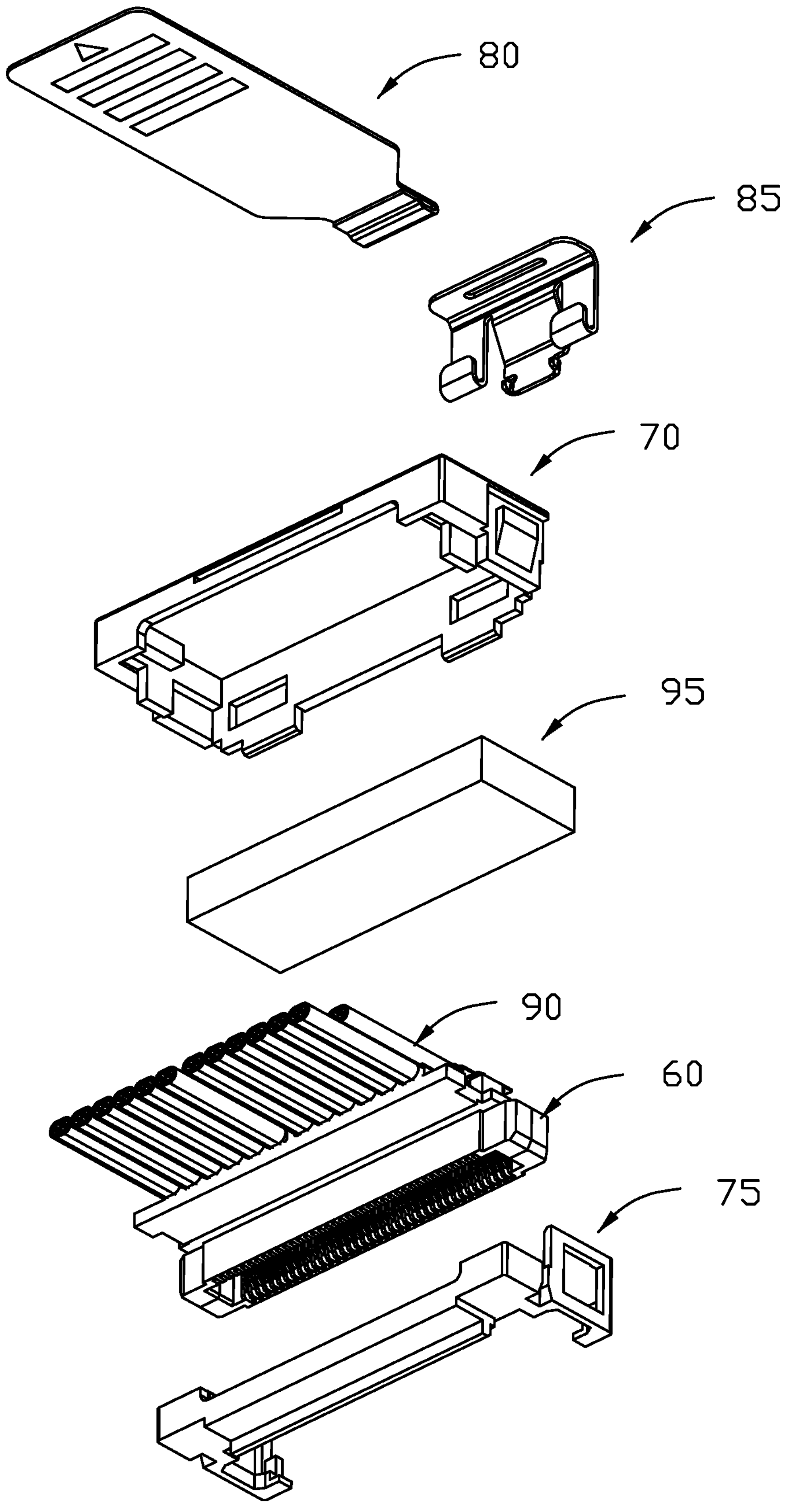
FIG. 9 is an exploded view of the plug connector in FIG. 7.
Figure 10:
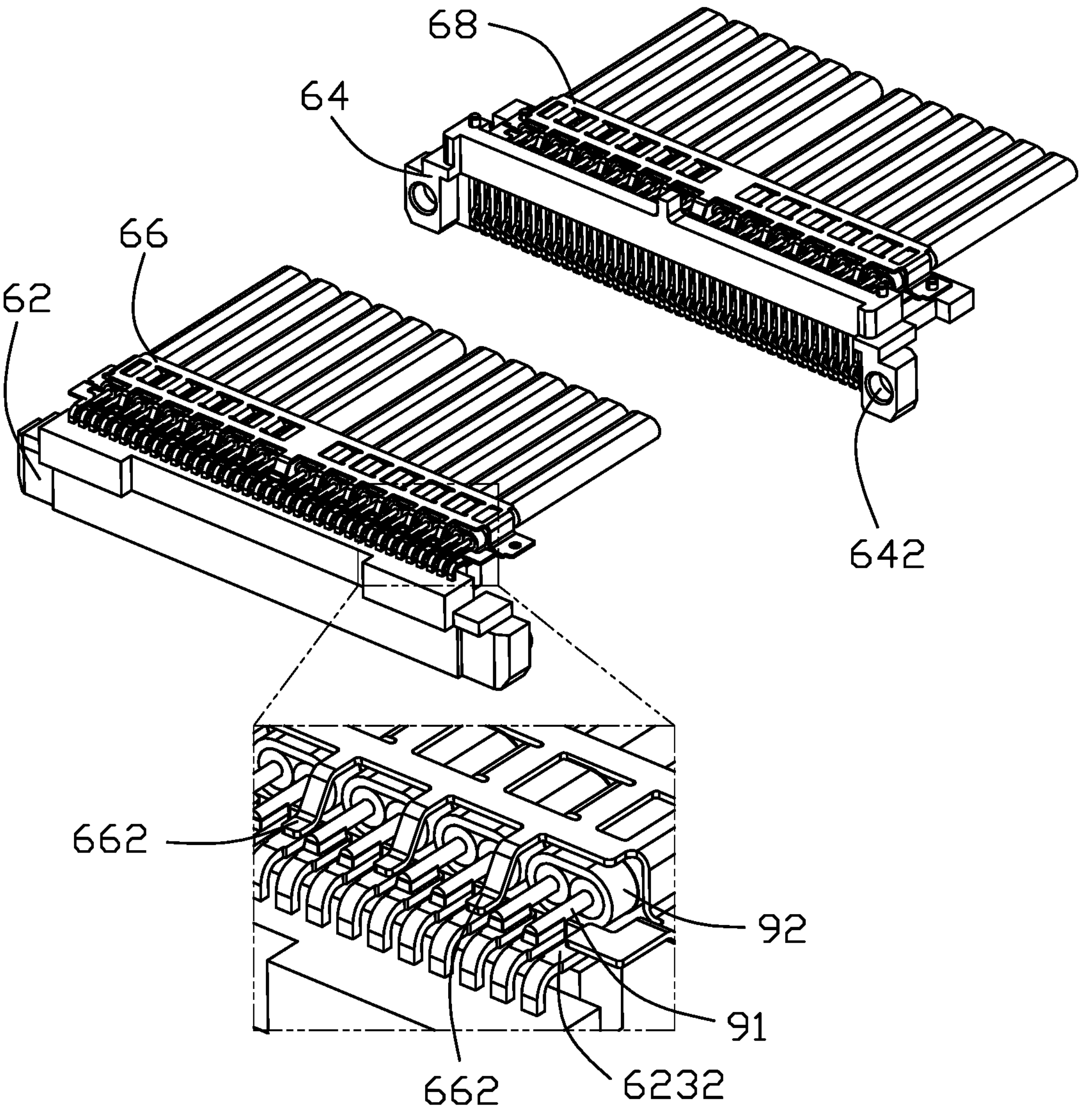
FIG. 10 is a further exploded view of a plug contact assembly of the plug connector.
Figure 11:
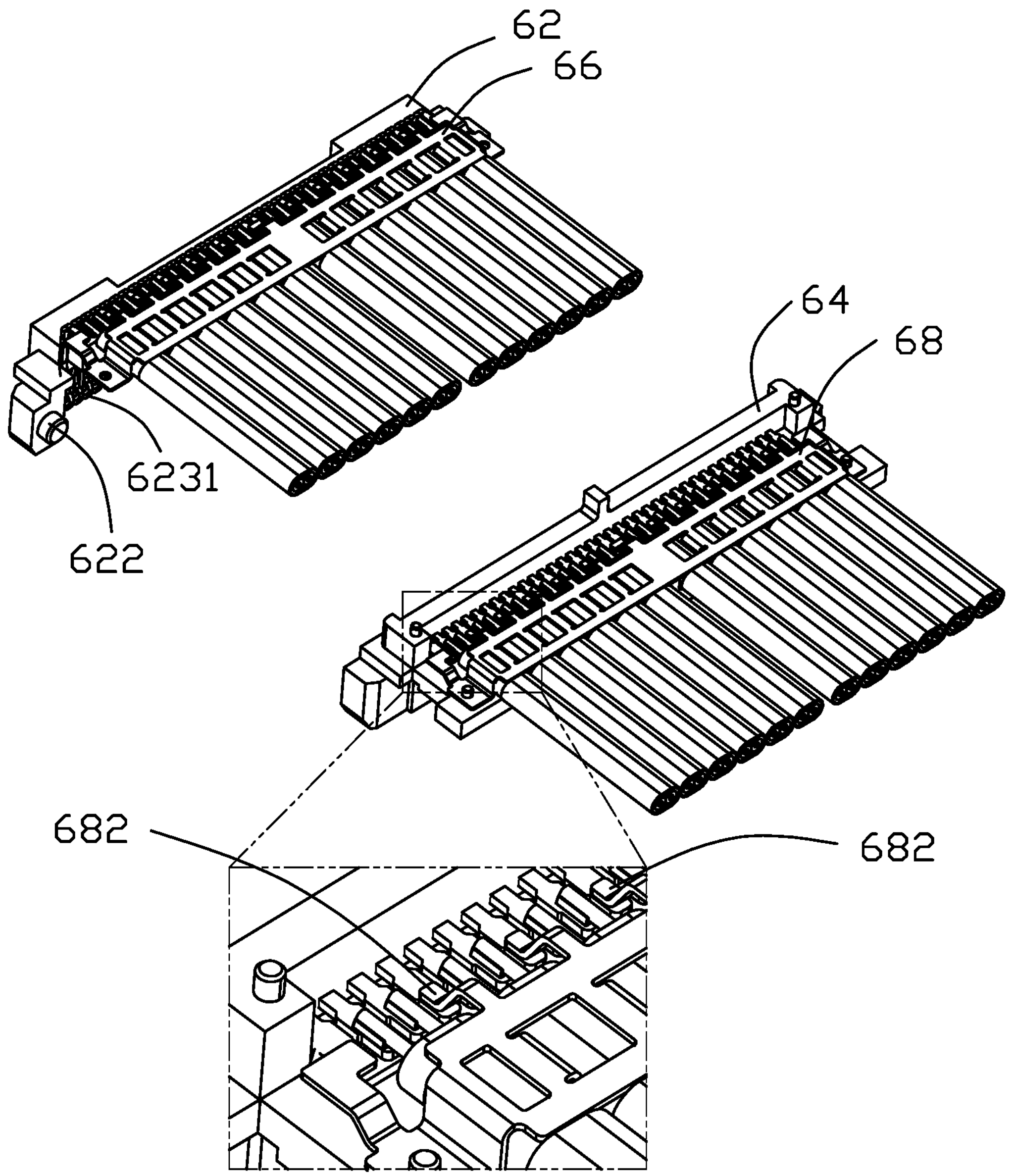
FIG. 11 is a view similar to FIG. 10 but from another perspective.
Figure 12:
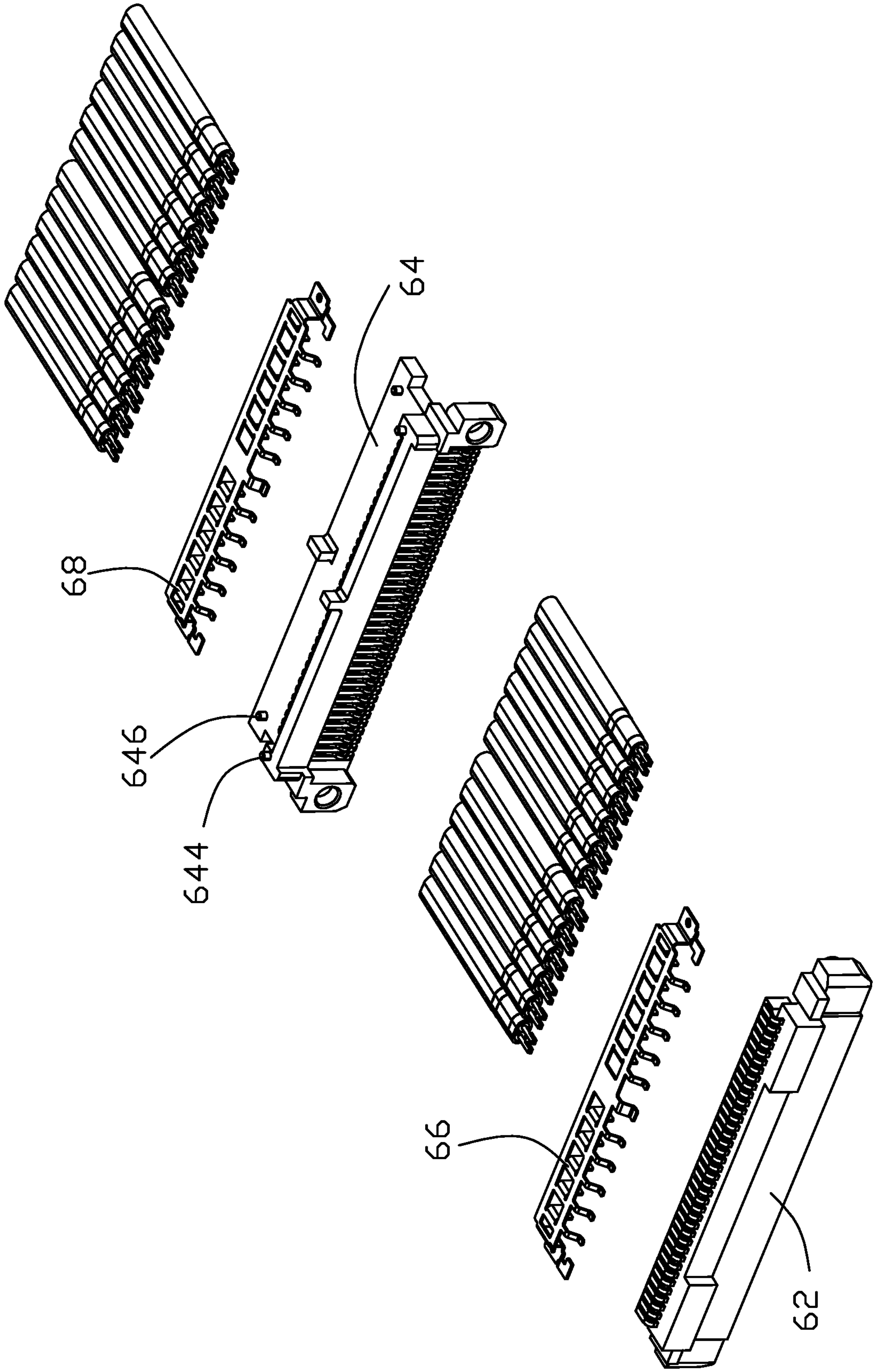
FIG. 12 is a still further exploded view of the plug contact assembly in FIG. 10.
Figure 13:
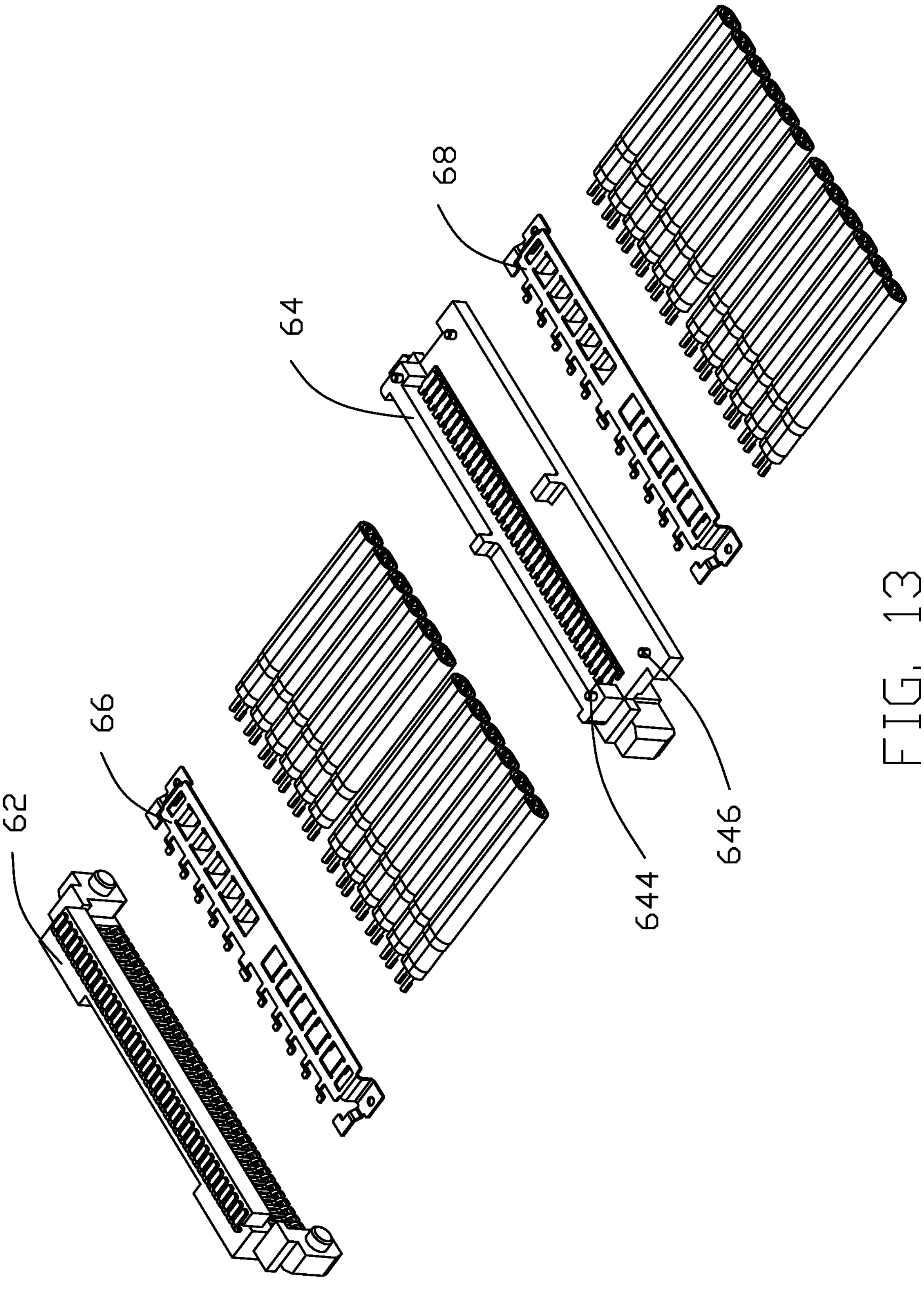
FIG. 13 is a view similar to FIG. 12 but from another perspective.

As best shown in FIGS. 6 and 7, the plug connector 50 for connecting with cables includes a mating portion 51 comprising two opposite long walls 511 and two opposite short walls 512 connecting with each other, and a receiving space 513 defined among the long walls and the short walls. The two rows of contacts 62 are arranged on inner sides of the long walls 511 and comprise elastic contacting portions 6231 protruding to the receiving space 513 and cable-connecting portions 6232. The latch 85 defines a locking head 851 protruding to an outside of one of the long walls 511.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. An electrical connector comprising:

a unitary insulative housing having a tongue and a cavity;

two rows of terminals molded in the insulative housing while exposing to two opposite surfaces of the tongue, respectively, each row of terminals comprising a plurality of signal terminals and a plurality of ground terminals, the plurality of ground terminals being exposed to the cavity; and a conductive plastic member molded in the cavity to be in contact with the plurality of ground terminals; wherein each ground terminal comprises a contacting portion, and the conductive plastic member has an upper surface substantially leveled with an upper end of the contacting portion.

2. The electrical connector as claimed in claim 1, further comprising a shroud enclosing the insulative housing.

3. The electrical connector as claimed in claim 2, further comprising a receptacle shell enclosing the shroud.

4. The electrical connector as claimed in claim 3, wherein the shell extends upward beyond a top face of the shround, the shell further defines a locking portion to be latched with a latch of a mating connector mating with the electrical connector.

5. The electrical connector as claimed in claim 4, wherein a mating space is defined among the shroud and the tongue, the terminals comprising upright portions with contacting surfaces exposed to the mating space and soldering portions extending from a bottom of the insulative housing.

6. A receptacle connector for mounting on a printed circuit board, comprising:

a seat comprising a bottom wall confronting with the printed circuit board, four upright walls, an upright tongue, and a mating space defined among the upright walls and the upright tongue, the receiving space opening upward from the bottom wall, the four upright walls comprising two opposite longitudinal walls and two transverse walls;

two rows of terminals comprising upright portions and soldering portions extending from the bottom wall, the upright portions defining contacting faces exposing upon two opposite surfaces of the upright tongue;

a metallic shell comprising four upright plates fitly enclosing the seat;

wherein three upright plates of the four upright plates are attached to one longitudinal wall and two transverse walls and extend upwards beyond a top face of the seat, and the upright plate attached to said one longitudinal wall defines a locking portion for latching to a mating plug connector; and wherein the upright plate attached to the other longitudinal wall defines a longitudinal notch having a top edge substantially leveled below the top face of the seat.

7. An electrical connector comprising:

a unitary insulative housing having a tongue and a cavity inside the tongue;

two rows of terminals molded in the insulative housing while exposing to two opposite surfaces of the tongue, respectively, each row of terminals comprising a plurality of signal terminals and a plurality of ground terminals, the plurality of ground terminals being exposed to the cavity; and a liquid metal ink or conductive ink that flows and then is cured in the cavity to be in contact with the plurality of ground terminals.

* * * * *